United States Patent [19]

Forse et al.

[11] 4,368,456
[45] Jan. 11, 1983

[54] APPARATUS FOR CORRELATING SUCCESSIVE IMAGES OF A SCENE

[75] Inventors: David P. S. Forse, Harrow; Richard W. Franks; Nigel T. Bamford, both of London; Philip V. Coates, Sunbury-on-Thames; Jan C. Thorscov, Uxbridge, all of England

[73] Assignee: EMI Limited, Hayes, England

[21] Appl. No.: 116,030

[22] Filed: Jan. 9, 1980

[30] Foreign Application Priority Data

Jan. 9, 1979 [GB] United Kingdom ............... 7900664

[51] Int. Cl.³ .............................................. G06K 9/00
[52] U.S. Cl. ............................ 340/146.3 Q; 364/728; 343/5 MM
[58] Field of Search ............ 343/5 MM; 340/146.3 Q; 364/456, 423, 516, 728; 371/67

[56] References Cited

U.S. PATENT DOCUMENTS 3,952,299 4/1976 Hodge ............................ 343/5 MM
4,084,255 4/1978 Casasent ...................... 340/146.3 Q
4,164,728 8/1979 Marsh ............................ 343/5 MM
4,244,029 1/1981 Hogan et al. ...................... 364/728

OTHER PUBLICATIONS

"Correlation Algorithms for Radar Map Matching", Novak, IEEE Transactions on Aerospace & Electronic Systems, vol AES-14, Jul. 1978, pp.641-648.

Primary Examiner—Sal Cangialosi
Attorney, Agent, or Firm—Fleit & Jacobson

[57] ABSTRACT

When correlating a reference representation with current representations the scales of which are changing, errors occur. In order to reduce the errors, a normal current representation is stored in a store (7), and a scaled current representation is stored in a store (8). Both representations are correlated in a correlator (11) with a normal reference representation stored in a store (9). The reference representation is updated by a control processor unit 5 when the correlation of it with the current representation reaches a peak. Instead of using two current representations a single current representation could be correlated with normal and scaled reference representations.

6 Claims, 3 Drawing Figures

APPARATUS FOR CORRELATING SUCCESSIVE IMAGES OF A SCENE

The present invention relates to a correlation apparatus for correlating successive images of a scene, produced by an imaging device, such as a television camera or an infra red, for example, with a reference image of the scene.

In a correlation arrangement successive current images of a scene are produced (e.g. by a television camera or an infra-red camera) and are correlated with a reference image representing at least a reference portion of the scene. Correlations are performed with the reference in a plurality of different positions relative to each current image. The position of the best correlation represents the position of the reference portion in the scene, whereby movements of the reference portion can be tracked in the scene.

The correlation of the reference and current images tends to deteriorate whenever the scale of the current images relative to the scene is varying in relation to the scale of the reference image relative to the scene. This occurs for example if the correlation arrangement is in an airborne vehicle travelling towards the scene, where the changing range introduces the need to repeatedly update the reference image, otherwise the correlation of the reference and current images rapidly deteriorate to an unacceptable level. An excessive number of updates causes the accumulation of errors in the position information.

One method of updating is to monitor a parameter indicative of the value of the best correlation of the reference image with each current image and to update the reference image when that value falls to a threshold value.

A serious error can arise if there is one strong feature in the scene which contributes a large part of the value of the correlations. As the range changes and the scale of the scene in the current images changes with respect to the image this strong feature will still contribute a large part of the value of the correlation. If the strong feature is not at the centre of the reference image the position of the best correlation in the current image tends to be drawn away from the originally designated aim point towards the strong feature. If an update occurs in this condition it is likely that the new reference image will be chosen in dependence upon the position of that best correlation (instead of upon the position in the image which corresponds to the centre of the old reference portion) producing an error which will be perpetuated.

It is an object of the present invention to provide a correlation arrangement in which errors due to changing scale of an image relative to a scene are at least partially avoided.

According to the invention there is provided a correlation arrangement comprising:

an input for receiving data forming a succession of current representations, having a first scale, of a scene;

means for deriving from that data a reference representation, having the first scale, of a portion of the scene and a further representation, having a second scale different to the first;

means for correlating the reference and current representations having the first scale, and for correlating the further representation as a current representation having the second scale with the said reference or as a reference representation having the second scale with the current representation; and control means for monitoring the correlations to replace the said reference representations with a new such representation when the correlation of the further representation with the representation with which it is correlated has a value which is a function of the best value of that correlation.

In an embodiment of the invention, the control means compares the correlations of the reference and current representations with those of the further representation and the representation with which it is correlated, and causes the replacement of the reference representation at a time after equality of the compared correlations which is a predetermined function of the time occuring between that equality and the previous replacement of the reference representation.

In an embodiment of the invention, the further representation is derived from the said data and represents a scaled version of the said reference representation, and the reference representation and the scaled reference representation are correlated with the current representations. In the example mentioned hereinbefore, of an airborne vehicle moving towards a scene, the further representation would represent an expanded version of the said reference representation, i.e. a representation of what the reference portion of the scene is anticipated to look like at some time in the future.

"Expanded representation" means a representation wherein the ratio of the size of the image represented thereby to the scene is bigger than the ratio of the size of the image represented by the representation with which it is compared to the size of the scene.

In a preferred embodiment, the further representation is derived from the said data and represents a scaled version of said current representations, and the reference representation is correlated with the current and the scaled current representations. In the example mentioned hereinbefore, the further representation would represent a compressed version of the said current representation.

"Compressed representation" means a representation wherein the ratio of the size of the image represented thereby to the scene is smaller than the ratio of the size of the image represented by the representation with which it is compared to the size of the scene.

Embodiments of the invention may have a fixed scaling factor between the said first and second scales. However the scaling factor may be variable either continuously or intermittently, or in some other manner.

For a better understanding of the present invention, reference will now be made, by way of example, to the accompanying drawings, in which.

Figure 1:
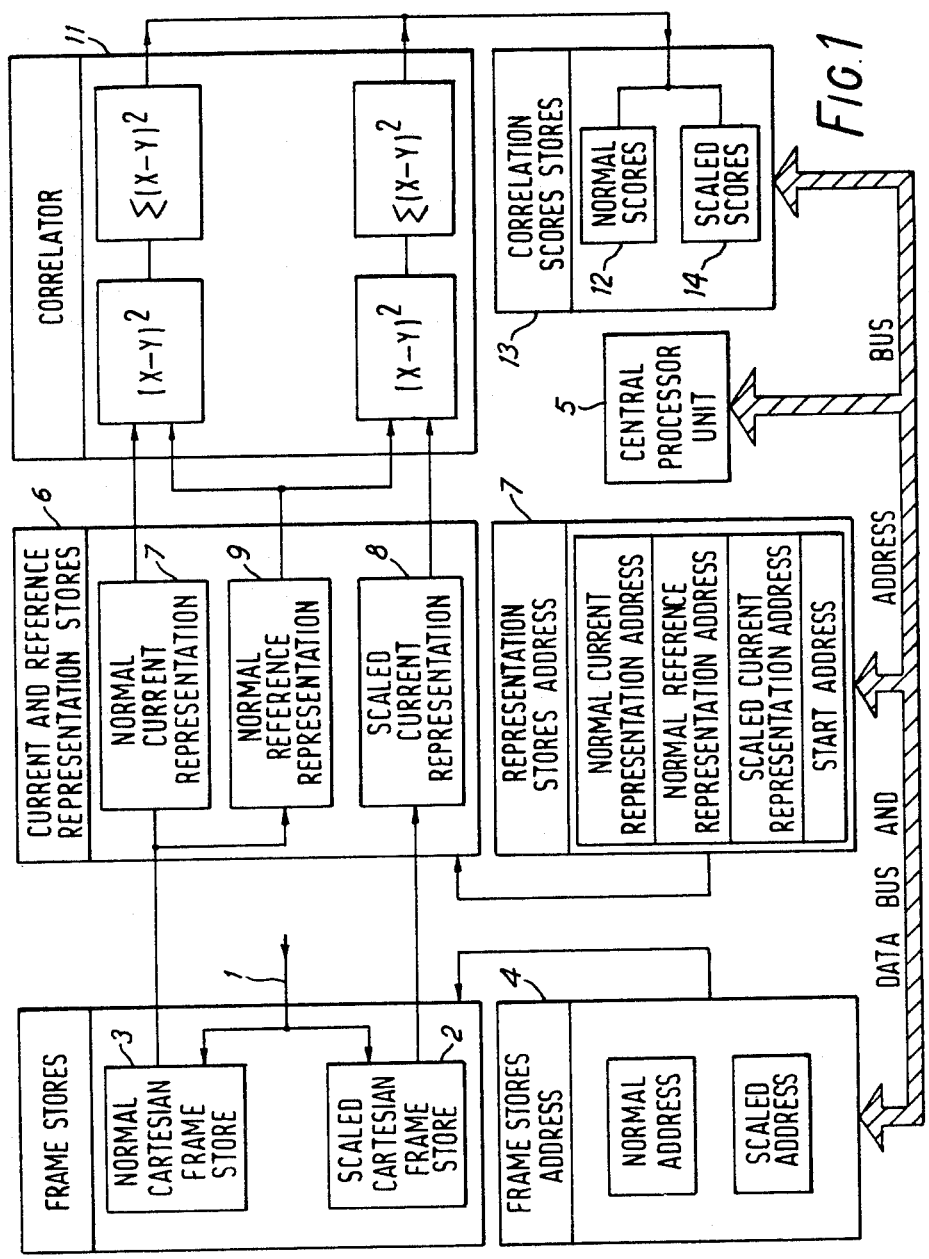
FIG. 1 is a schematic diagram of an example of a correleation arrangement according to the invention.

The arrangement of FIG. 1 operates as follows:

Successive frames of current video information representing a scene are fed via an input 1 to frame stores 2 and 3 in a frame store arrangement. The stores store the information at addresses specified by a frame store address arrangement 4 (which may be under the control of a central processor unit 5 for purposes not associated with the present invention and thus will not be discussed herein). The store 3 stores a frame of video information (hereinafter referred to as 'normal' information) in cartesian form and store 2 stores a frame of video information in cartesian form on a compressed scale relative to that in the store 3, this information being referred to hereinafter as 'scaled' information.

A current and reference representation store arrangement 6 derives information from the frame store arrangement; the information and its times of derivation being specified by a current and reference representation store address arrangement 7 which is also under the control of the central processor unit 5. The arrangement 6 comprises stores 7 to 9. The store 7 stores normal information, derived from the normal frame store 3, representing a portion of the scene; this information is hereinafter called the "normal current representation". The store 8 similarly stores scaled information, derived from the scaled frame store 2, representing a portion of the scaled scene; this information is hereinafter called the "scaled current representation". The normal and scaled current representations are replaced by new such representations for each frame period. The store 9 stores information, derived from the normal frame store, which represents a reference picture and is called the reference representation hereinafter. The reference representation is replaced by a new reference representation provided in accordance with the present invention, as described hereinafter.

The reference representation is correlated with the current representations in a correlator and accumulator arrangement 11. In this example, the reference representation comprises 7 rows × 7 columns to 20 rows × 20 columns of pixels and each current representation comprises 11 × 11 to 24 × 24 pixels respectively. Correlation is performed as follows:

Assume, for example the reference representation comprises 7 × 7 pixels and each current representation comprises 11 × 11 pixels. The reference representation A is correlated in 25 positions with the normal current representation. In each position each pixel of the reference representation is associated with a corresponding pixel Y of the current representation according to an association function, $(X-Y)^2$ i.e. the square of the difference of the pixels is found. The sum $\Sigma(X-Y)^2$ of these squared differences for each position is referred to hereinafter as a "correlation score". It is stored in a normal scores store 12 of a correlation scores store arrangement 13. Thus correlating the reference representation A with the normal current representation will produce 25 correlation scores $\Sigma(X-Y)^2$ which are stored in the normal scores store 12. The reference representation is similarly correlated with the scaled current representation, the 25 resulting correlation scores being stored in a scaled scores store 14 of the arrangement 13.

The correlation scores are stored in the stores 12 and 14 at addresses corresponding to the position, relative to the current representations, of the reference representation at which these scores were produced. The central processor unit 5 searches the stores 12 and 14 for the best score (in this example, the lowest score), to determine therefrom the position of best registration of the reference representation with the current representation. (The unit 5 may perform curve fitting operations or interpolation to find this position). The position of best fit is then used by the unit 5 to specify the addresses of the information in the frame stores 3 and 2 which is to be transferred to the current representation stores 7 and 8. (The unit may use the position of best fit directly or may use information about the past positions of best fit to predict where the next position of best fit will be to specify these addresses).

The unit 5 uses the stored normal scores and the stored scaled scores to update the reference representation in accordance with the invention.

The principle of updating in accordance with the invention, in this example, is as follows.

If the correlation arrangement is on an aircraft for example, which is approaching a target being tracked by the arrangement the scale of the target will be changing; it will appear to get bigger.

Assume an update of the reference representation has occurred. As the target appears to get bigger, the correlations between the reference representation and the normal current representation will deteriorate whilst those between reference representation and the scaled current representation will improve. Eventually the correlations of the reference representation with the scaled current representation will equal those with the normal current representation; (this event is called "crossover" hereinafter). The correlations of the reference representation with the scaled current representation will eventually reach a peak. In principle, the reference representation is updated at this time.

However, in practice, instead of actually detecting the peak correlation of the reference representation with the scaled current representation the following technique is used. It has been found that the peak correlation of the reference representation and the sealed current representation occurs after crossover which is some function of the number of frames between the previous update and the crossover.

Therefore, in the present example, the time of updating the reference representation is determined by counting the number D of frames between the previous update and crossover, and updating when the number E of frames after crossover is equal to or greater than a given proportion of the number D i.e. when E>KD K may be greater than or less than 1 and is chosen to achieve the best approximation to updating at the peak correlations core between the reference representation and the scaled current representation.

The updating is controlled by the central processor unit 5. The manner of operation of the unit is illustrated in the flow diagram of FIG. 2.

The unit 5 makes an initial update of the reference representation, and initially sets a count D of the number of frames from that update to zero; a count E is also then set to zero. The unit then causes the correlator and accumulator arrangement 11 to calculate the correlation scores which are stored in the correlation scores stores arrangement 13. The unit 5 also compares the normal scores with the scaled scores. If, as will be the case initially, the normal scores are better (i.e. less than) the scaled scores, the normal position data, i.e. the scores from correlation of the reference and normal representations, are used to find the position of best fit; the next frame is fed to the normal and scaled current representation stores and count D is incremented by 1. This sequence is repeated until the normal scores are worse (i.e. greater than) the scaled scores. When this happens, the scaled position data are used to find the position of best fit and the count E is incremented by one for each frame until E>KD at which time the reference representation is updated.

Figure 3:
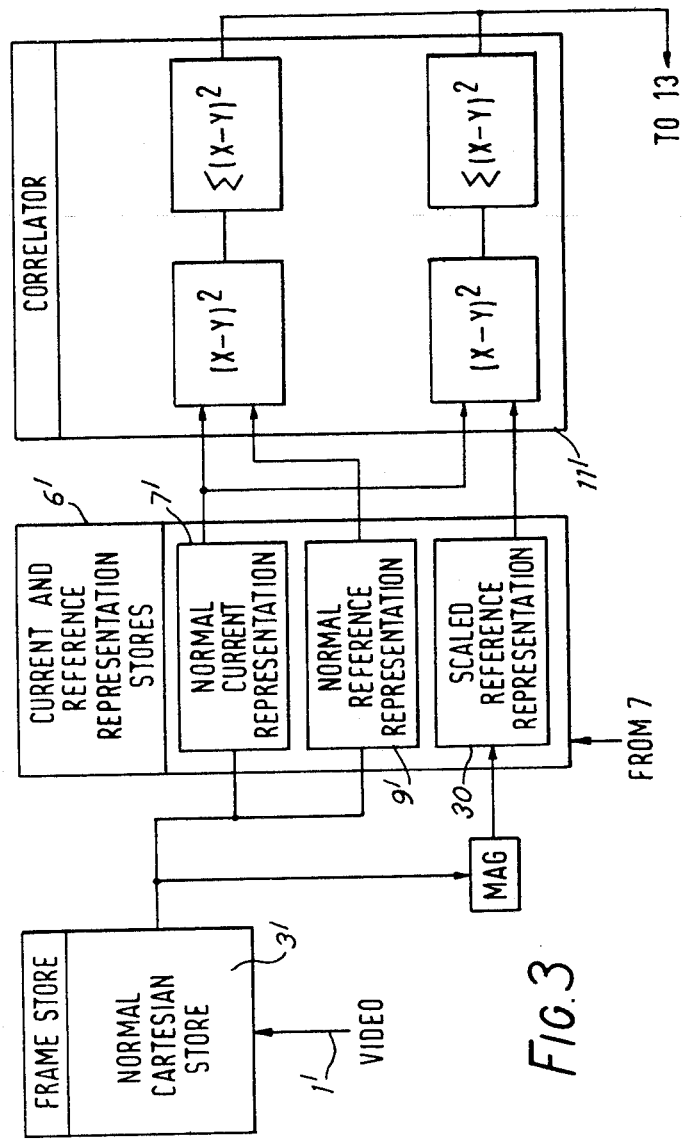
FIG. 3 is a schematic diagram of a modification of part of the arrangement of FIG. 1.

The frame store arrangement, the current and reference representation store arrangement 6 and the correlation and accumulator arrangement 11 of FIG. 1 may be replaced by the equivalent arrangements shown in FIG. 3. In the correlation arrangement of FIG. 3, a normal reference representation and a normal current representation are derived from a normal cartesian store 3' in the same way as in the arrangement of FIG. 1. However, instead of deriving a scaled current representation, a scaled reference representation, which is stored in a store 30 is derived from the normal cartesian store using a scale changing algorithm in a scale changer MAG. The algorithm expands the scale of the information in the normal cartesian store 3' to produce the scaled reference representation.

The normal reference and current representations and the normal current and scaled reference representations are correlated in the arrangement 11'. The resulting normal and scaled correlation scores are stored in the stores arrangement 13 (FIG. 1) and the central processor unit 5 monitors the correlation scores as described hereinbefore for tracking and updating.

Figure 2:
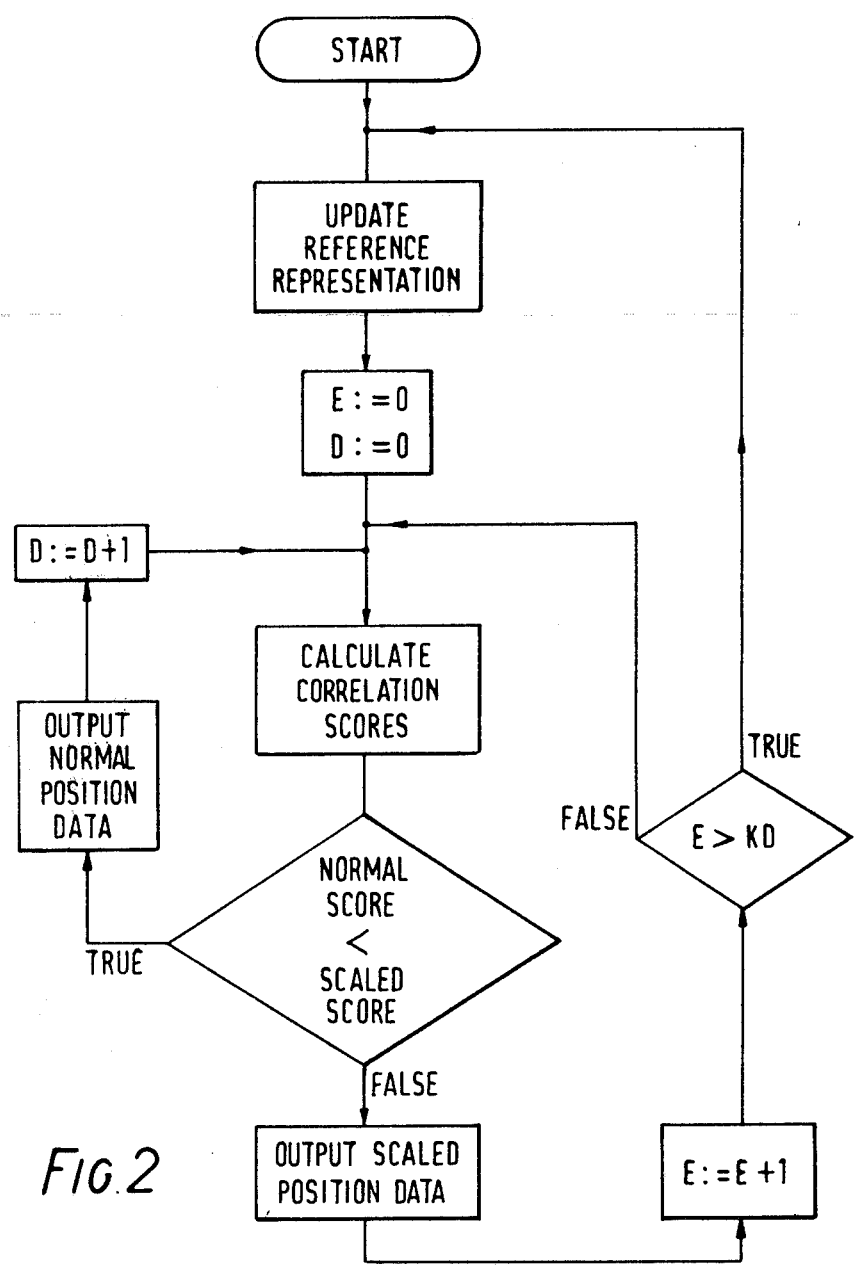
FIG. 2 is a flow diagram illustrating the operation of the central processor unit of the arrangement of FIG. 1.

The embodiments described hereinbefore have a fixed scaling factor, in the case of FIGS. 1 and 2 between the scaled and normal current representations, and in the case of FIG. 3 between the scaled and normal reference representations. However the scaling factor may be variable. The scaling factor is advantageously variable if the scene is viewed through an optical arrangement of variable magnification (e.g. a zoom lens) to derive the video information fed to the frame stores 2 and 3. The scaling factor is then varied as the reciprocal of the anticipated magnification change between updates of the reference representation.

It is to be appreciated that the "squares of differences" association function mentioned hereinbefore is merely one example of many different functions which could be used.

We claim:

1. A correlation apparatus comprising,
   storage means containing respective storage location for storing data relating to a first succession of representations of a scene, a second succession of representations of the scene corresponding to the first succession of representations but having a scale less than that of the first succession of representations, and a reference representation of at least a portion of the scene having a scale greater than at least the initial representation of the second succession of representations,
   first comparing means for comparing the reference representation with the first succession of representations to form respective first comparison signals indicative of the degree of similarity between compared representations,
   second comparing means for comparing the reference representation with the second succession of representations to form further respective comparison signals indicative of the degree of similarity between compared representations,
   further means for comparing the first comparison and further comparison signals, and
   control means for replacing the reference representation with a selected one of the first succession of representations in dependence on the comparison of the further comparison means.

2. A correlation arrangement according to claim 1 wherein the control means includes means for identifying equality of the first comparison and further comparison signals, and means for causing replacement of the reference representation with the representation of said first succession of representation prevailing at a predetermined time interval after that equality occurs.

3. A correlation arrangement according to claim 1 or claim 2 including means for utilising the first comparison signals generated before said equality occurs and the further comparison signals generated after said equality to determine the position of best fit of the first succession of representations with the reference representation.

4. A correlation apparatus comprising,
   storage means containing respective storage locations for storing data relating to a succession of representations of a scene, a first reference representation of at least a portion of the scene and a second reference representation of said portion having a scale greater than that of the first reference representation,
   first comparing means for comparing the succession of representations of the scene with the first reference representation, to generate first respective comparison signals indicative of the degree of similarity between compared representations,
   second comparing means for comparing the succession of representations of the scene with the second reference representation to generate further respective comparison signals indicative of the degree of similarity between compared representations,
   further comparing means for comparing the first comparison and further comparison signals,
   and control means for replacing the first reference representation with a selected one of the said succession of representations in dependence on the comparison of said first comparison and further comparison signals.

5. A correlation arrangement according to claim 4 wherein the control means includes means for identifying equality of the first and further comparison signals, and means for causing replacement of the reference representation with the representation of said succession of representations prevailing at a predetermined time interval after that equality occurs.

6. A correlation arrangement according to claim 4 or claim 5 including means for utilising the first comparison signals generated before said equality occurs and the further comparison signals generated after said equality occurs to determine the position of best fit of the first succession of representations with the reference representation.

* * * * *